US011526823B1

(12) United States Patent
Ben-Tsvi et al.

(10) Patent No.: US 11,526,823 B1
(45) Date of Patent: Dec. 13, 2022

(54) SCHEDULING RESOURCE-CONSTRAINED ACTIONS

(71) Applicant: Intrinsic Innovation LLC, Mountain View, CA (US)

(72) Inventors: Ytai Ben-Tsvi, Sunnyvale, CA (US); Ian Eldred Pudney, Mountain View, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 271 days.

(21) Appl. No.: 16/728,530

(22) Filed: Dec. 27, 2019

(51) Int. Cl.
  *G06Q 10/06* (2012.01)
  *G05D 1/02* (2020.01)
  *G06Q 50/04* (2012.01)

(52) U.S. Cl.
  CPC ....... *G06Q 10/06316* (2013.01); *G05D 1/021* (2013.01); *G05D 1/0289* (2013.01); *G06Q 50/04* (2013.01)

(58) Field of Classification Search
  CPC .. G06Q 10/06316; G06Q 50/04; G05D 1/021; G05D 1/0289; G05B 19/41865; G05B 2219/32328; G05B 2219/40113
  See application file for complete search history.

(56) References Cited

U.S. PATENT DOCUMENTS

| 4,586,151 A | 4/1986 | Buote |
| 4,928,245 A | 5/1990 | Kelly et al. |
| 4,974,191 A | 11/1990 | Annirghodsi |
| 5,347,459 A | 9/1994 | Greenspan et al. |
| 5,434,489 A | 7/1995 | Cheng et al. |
| 5,452,238 A | 9/1995 | Kramer et al. |
| 5,499,320 A | 3/1996 | Backes et al. |

(Continued)

FOREIGN PATENT DOCUMENTS

| CN | 1542603 | 11/2004 |
| DE | 102012206952 | 10/2013 |

(Continued)

OTHER PUBLICATIONS

Araujo et al. "Hierarchical Scheduling of Robotic Assembly Operations in a Flexible Manufacturing System," Fifth International FAIM Conference, Jun. 1995, 13 pages.

(Continued)

*Primary Examiner* — Jeff A Burke
*Assistant Examiner* — Joshua Alexander Garza
(74) *Attorney, Agent, or Firm* — Fish & Richardson P.C.

(57) ABSTRACT

Methods, systems, and apparatus, including computer programs encoded on computer-storage media, for scheduling resource-constrained actions. In some implementations, data indicating a set of tasks to be performed by a group of multiple robots is received. A set of candidate plan elements is determined for each task in the set of tasks. A constraint profile for each of the candidate plan elements is generated, where each of the constraint profiles indicates a constraint to be satisfied in order to carry out the corresponding candidate plan element. Plan elements configured to perform each of the tasks in the set of tasks are selected based on the constraint profiles, and assembled into a schedule according to optimization criteria. This schedule can be used to perform tasks, and the schedule may account for variability in timing without failure.

20 Claims, 5 Drawing Sheets

(56) References Cited

U.S. PATENT DOCUMENTS

| | | | |
|---|---|---|---|
| 5,579,444 | A | 11/1996 | Dalziel et al. |
| 6,004,016 | A | 12/1999 | Spector |
| 6,243,622 | B1 | 6/2001 | Yim et al. |
| 6,292,715 | B1 | 9/2001 | Rongo |
| 6,370,573 | B1 | 4/2002 | Bowman-Amuah |
| 6,470,225 | B1 | 10/2002 | Yutkowitz |
| 6,493,607 | B1 | 12/2002 | Bourne et al. |
| 6,804,580 | B1 | 10/2004 | Stoddard et al. |
| 6,889,118 | B2 | 5/2005 | Murray, IV et al. |
| 7,089,083 | B2 | 8/2006 | Yokoo et al. |
| 7,530,068 | B2 | 5/2009 | Clark |
| 8,452,448 | B2 | 5/2013 | Pack et al. |
| 8,473,085 | B2 * | 6/2013 | Sim ............... B25J 9/1666  700/99 |
| 9,050,723 | B1 | 6/2015 | Elazary |
| 9,252,584 | B2 | 2/2016 | Aldrich |
| 9,457,468 | B1 | 10/2016 | Elazary |
| 9,513,627 | B1 | 12/2016 | Elazary et al. |
| 9,720,736 | B2 | 8/2017 | Kochunni |
| 9,817,645 | B2 | 11/2017 | Nos |
| 9,975,246 | B2 | 5/2018 | Mazel et al. |
| 11,188,097 | B1 * | 11/2021 | Zou ............... G05D 1/0291 |
| 2003/0100957 | A1 | 5/2003 | Chaffee et al. |
| 2004/0078109 | A1 | 4/2004 | Babikian et al. |
| 2004/0243281 | A1 | 12/2004 | Fujita et al. |
| 2004/0254771 | A1 | 12/2004 | Reiner et al. |
| 2006/0089739 | A1 | 4/2006 | Sheriff et al. |
| 2007/0112700 | A1 | 5/2007 | Haan et al. |
| 2009/0234499 | A1 | 9/2009 | Nielsen et al. |
| 2013/0235034 | A1 | 9/2013 | Reitan |
| 2013/0282182 | A1 * | 10/2013 | Hideg ............... B23K 31/02  700/275 |
| 2014/0278091 | A1 | 9/2014 | Horvitz et al. |
| 2014/0316566 | A1 | 10/2014 | Mazel et al. |
| 2014/0365258 | A1 | 12/2014 | Vestal et al. |
| 2016/0277970 | A1 | 9/2016 | Werneke |
| 2017/0050321 | A1 | 2/2017 | Look et al. |
| 2017/0102969 | A1 | 4/2017 | Kochunni |
| 2017/0308096 | A1 | 10/2017 | Nusser et al. |
| 2018/0239343 | A1 * | 8/2018 | Voorhies ............... G05D 1/0234 |
| 2018/0319015 | A1 | 11/2018 | Sinyavskiy et al. |
| 2020/0174460 | A1 | 6/2020 | Byrne et al. |
| 2021/0188430 | A1 * | 6/2021 | Kisiler ............... G08G 5/0034 |

FOREIGN PATENT DOCUMENTS

| | | |
|---|---|---|
| KR | 0161003 | 12/1998 |
| WO | WO 2013/160195 | 10/2013 |
| WO | WO 2014/081699 | 5/2014 |

OTHER PUBLICATIONS

Coenen, "Motion Planning for Mobile Robots," Thesis for Master's Degree, Eindhoven University of Technology, Department of Mechanical Engineering. Nov. 2012, 85 pages.

Dean et al. "An Analysis of Time-Dependent Planning," AAAI Proceedings. Aug. 1988, 6 pages.

fr.com [online], "Operations Research and Constraint Programming at Google," available on or before Jun. 23, 2020. via Internet Archive: Wayback Machine URL <https://web.archive.org/web/20200623112752/https://developers.google.com/optimization/cp/cp_solver>, retrieved on Jul. 17, 2020, URL<https://web.archive.org/web/20200623112752/https:/developers.google.com/optimization/cp/cp_solver>, 7 pages.

Hlavac, "Robot Trajectory Generation," Czech Technical University in Prague, Czech Institute of Informatics, Robotics and Cybernetics, Feb. 26, 2017, 51 pages.

Li et al., "A Review on Integrated Process Planning and Scheduling," Int. J. Manufacturing Research, Jan. 2010, 5(2), 20 pages.

Martin et al., "Technology and Innovation for the Future of Production: Accelerating Value Creation," White paper, World Economic Forum, Mar. 2017, 38 pages.

Mckee et al., "Resource management for networked robotics systems," IEEE, 1997, 1363-1368.

Mock et al., "Real-time communication in autonomous robot systems," IEEE, 1999, 1-8.

PCT International Search Report and Written Opinion in International Appln. No. PCT/US2020/015003, dated May 4, 2020, 18 pages.

People.cs.pitt.edu [online] "Synchronization Class Notes," Jun. 20, 2013, retrieved on Jul. 20, 2020, retrieved from URL<http://people.cs.pitt.edu/~manas/courses/2510/semaphore.html>, 5 pages.

Petrinec et al., "Trajectory planning algorithm based on the continuity of jerk," Mediterranean Conference on Control and Automation, Jul. 27-29, 2007, 5 pages.

Quinlan et al., "Elastic Bands: Connecting Path Planning and Control," IEEE Xplore, Aug. 2002, 6 pages.

Ravankar et al., "Path Smoothing Techniques in Robot Navigation: State-of-the-Art, Current and Future Challenges," Sensors (Basel), 2018, 18(9):3170.

Reagin et al., "A component-based software architecture for robotic workcell applications," IEEE, 1999, 85-94.

Researchgate.net [online] "Multi-Agent Management of Joint Schedules," Jan. 2006, retrieved on Jul. 20, 2020, retrieved from URL<https://www.researchgate.net/profile/Stephen_Smith14/publication/221250619_Multi-Agent_Management_of_ Joint_Schedules/links/00b4951881d907ee99000000/Multi-Agent-Management-of-Joint-Schedules.pdf>, 9 pages.

Ruml et al., "On-line Planning and Scheduling: An Application to Controlling Modular Printers," Journal of Artificial Intelligence Research, Feb. 2011, 40, 54 pages.

Sellner et al., "Proactive Replanning for Multi-Robot Teams," Technical Report, Robotics Institute, Jun. 2006, 51 pages.

Sun et al., "A Model-Driven Approach to Support Engineering Changes in Industrial Robotics Software," International Conference on Model Driven Engineering Languages and Systems, Sep. 2012, 15 pages.

Wang et al., "Resource sharing in distributed robotic systems based on a wireless medium access protocol (CSMA/CD-W)," IEEE, 1994, 784-791.

Wikipedia.com [online], "Constraint programming," Jun. 19, 2020, retrieved on Jul. 17, 2020, retrieved from URL<https://en.wikipedia.org/wiki/Constraint_prograimning>, 8 pages.

Wikipedia.com [online], "Mutual exclusion," Apr. 6, 2020, retrieved on Jul. 17, 2020, retrieved from URL>https://en.wikipedia.org/wiki/Mutual_exclusion>, 6 pages.

Wildpedia.com [online], "Semaphore (programming)," Jun. 14, 2020, retrieved on Jul. 17, 2020, retrieved from URL<https://en.wikipedia.org/wiki/Semaphore_(programming)>, 6 pages.

Wikipedia.org [online] "Lock (computer science)," Last updated on Feb. 5, 2018, retrieved on Apr. 23, 2018, retrieved from URL< https://en.wikipedia.org/wiki/Lock_(computer_science)>, 8 pages.

www.ene.ttu.ee [online], "Path and Trajectory Planning," Nov. 6, 2020, retrieved on Jul. 17, 2020, retrieved from URL<http://www.ene.ttu.ee/elektriajamid/oppeinfo/materjal/AAR0040/03_Robotics.pdf>, 28 pages.

www.freertos.org [online] "Queues, Mutexes, Semaphores," May 19, 2021, retrieved on Jul. 20, 2020,, retrieved from URL<https://www.freertos.org/Real-time-embedded-RTOS-mutexes.html>, 4 pages.

www.keil.com [online] "CMSIS-RTOS Version 1.03: Semaphores," Feb. 22, 2018, retrieved on Jul. 20, 2020, retrieved from URL<https://www.keil.com/pack/doc/CMSIS/RTOS/html/group_CMSIS_RTOS_SemaphoreMgmt.html>, 8 pages.

www.webopedia.com [online] "Mutex—mutual exclusion object," May 29, 2001, retrieved on Jul. 20, 2020, retrieved from Internet: URL< https://www.webopedia.com/TERM/M/mutex.html> 4 pages.

Zhao et al., "Trajectory planning and control for robot manipulations," Robotics [cs.RO]. Universite', 2015, 158 pages.

* cited by examiner

SCHEDULING RESOURCE-CONSTRAINED ACTIONS

TECHNICAL FIELD

The present specification relates to scheduling resource-constrained actions, such as scheduling actions among a group of robots or other devices.

BACKGROUND

Many manufacturing tasks and other tasks involve complex sets of interrelated actions to be performed. For example, constructing an automobile, an airplane, a house, or another object often involves many steps that need to be performed in an appropriate sequence to achieve the desired result.

SUMMARY

In some implementations, a computer system provides functionality to efficiently plan and schedule actions to perform a complex task. For example, the system can schedule actions to be taken by robots to perform an industrial fabrication process. In some cases, the system can determine how to efficiently utilize multiple robots in a work cell in order to carry out a fabrication process. The system can identify activities or tasks that make up the fabrication process. For each of the different tasks, the system defines a set of candidate plan elements that represent alternative ways of performing the task. For example, different plan elements for task may involve using a different robot in the work cell, a different path of travel for a robot, approaching a work piece from a different direction, etc. The system selects from among the candidate plan elements to select a set of plan elements that distributes the tasks among the robots so that the fabrication process can be performed in an efficient manner, e.g., to minimize completion time, conserve energy, limit material use, and/or meet other objectives. While various examples herein involve manufacturing applications, the techniques in this document can be used to orchestrate the actions of multiple robots, devices, or other agents for other applications also.

To effectively and efficiently schedule the robot actions, the system can define a constraint profile for each of the candidate plan elements. The system can identify constraints that need to be satisfied in order for a robot to perform the respective candidate plan elements. These constraints can include, e.g., resource constraints that indicate resources (e.g., tools and consumables), spatial constraints that indicate spatial regions a robot would need to move in (e.g., spatial constraints which can be used to prevent machines from crashing into objects or each other, or otherwise limit movement), and continuity constraints that indicate a state of robot (e.g., location, configuration, pose, items carried, etc.) needed at the beginning, middle, or end of carrying out the plan element.

The continuity constraints, in particular, can avoid discontinuities or gaps between the execution of different tasks or operations. For example, the continuity constraints that define beginning and end states for tasks can be used to ensure that no machine or object is expected to instantly jump from one location or state to another. Rather, by aligning the end state of each planned operation with the beginning state of the next planned operation, the system can verify that the series of planned operations can be carried out without disruptive breaks between planned operations. In other words, satisfying the continuity constraints can ensure that when each planned operation begins, the robot(s) and/or object(s) involved are in the state that is expected and needed for that operation, rather than potentially being at a different, unexpected state.

With the constraints of each candidate plan element defined, the system can use the constraint profiles to select and sequence plan elements to meet certain criteria, e.g., to minimize total time, minimize energy consumption, etc. For example, the system can compare the constraint profiles of two plan elements to determine whether any of the constraints conflict, such as by the plan elements requiring occupancy of the same spatial region by different robots or objects. If there is a conflict, the system can order the plan elements sequentially rather than concurrently. As another option, the system may select a different set of plan elements that do not conflict and so can be performed concurrently.

One of the benefits of defining constraint profiles for the plan elements is that it allows the complex scheduling process to be formulated as a constrained programming problem. The requirements of the fabrication process and the constraints of the various potential ways of performing the tasks within the fabrication process can be expressed as constraints. The resulting schedule can then be generated using a constrained programming solver.

In some implementations, each of the plan elements represents a non-divisible or atomic element to be scheduled. The plan elements can be scheduled so that the start times of each plan element are controlled, e.g., plan elements can be scheduled so that actions of a second plan element to not begin until actions of a first plan element are complete. However, the system does not need to time synchronize the performance of actions within each plan element. In other words, scheduling using the constraints discussed herein can be robust enough to produce the desired results and sequence using only signals for the beginning and ending of plan elements, even if the duration of each plan element is unknown or variable. As a result, the schedules generated by the system can be used effectively in real fabrication scenarios where interruptions, changing environments, and unexpected situations are common.

In one general aspect, a method performed by one or more processors includes: obtaining, by the one or more processors, data indicating a set of tasks to be performed by a group of robots; determining, by the one or more processors, a set of candidate plan elements for each task in the set of tasks, where each of the sets of plan elements includes candidate plan elements or combinations of candidate plan elements that provide alternative ways for the robots to perform the task; determining, by the one or more processors, a constraint profile for each of the candidate plan elements, where each of the constraint profiles indicates a constraint to be satisfied in order to carry out the corresponding candidate plan element; and selecting, by the one or more processors, plan elements configured to perform each of the tasks in the set of tasks, where the plan elements are selected from among the sets of candidate plan elements based on the constraint profiles.

In some implementations, for each of at least some of the constraint profiles, the constraint profile indicates a resource constraint that represents one or more resources that a robot needs in order to carry out actions of the corresponding candidate plan element.

In some implementations, the resource constraint includes a constraint to acquiring one or more tokens from a semaphore representing a level of availability of one or more resources.

In some implementations, a particular constraint profile includes a resource constraint for a consumable resource, the particular constraint profile indicating that the corresponding candidate plan element acquires tokens from a semaphore for the consumable resource and the tokens are expended as a result of performing the actions of the candidate plan element.

In some implementations, a particular constraint profile includes a resource constraint for a non-consumable resource, the particular constraint profile indicating that the corresponding candidate plan element (i) acquires a token from a semaphore for the non-consumable resource in order to carry out actions of the corresponding candidate plan element and (ii) retains or returns the acquired token to the semaphore for the non-consumable resource.

In some implementations, for each of at least some of the constraint profiles, the constraint profile indicates a spatial constraint on positioning of a robot, the spatial constraint representing a region that a robot needs to occupy in order to carry out the actions of the candidate plan element.

In some implementations, the region is a two-dimensional region.

In some implementations, the region is a three-dimensional region.

In some implementations, the region includes one or more swept regions representing all points occupied by a robot in carrying out the actions of the corresponding candidate plan element.

In some implementations, the spatial constraint is expressed as a mutex such that the entire region is required to be available in order to initiate the actions of the candidate plan element, and other robots are blocked from entering the region until the end of the actions of the candidate plan element.

In some implementations, for each of at least some of the constraint profiles, the constraint profile indicates a continuity constraint that constrains a state of a robot at a beginning and/or an end of carrying out the actions of the candidate plan element.

In some implementations, the state of the robot includes a location of the robot.

In some implementations, the state of the robot includes at least one of a configuration of the robot, a pose of the robot, or an item carried or not carried by the robot.

In some implementations, at least one of the constraint profiles indicates (i) a resource constraint requiring availability of a resource, (ii) a spatial constraint requiring availability of a spatial region, and (iii) a continuity constraint requiring a state or configuration of a robot at a beginning and/or end of a candidate plan element.

In some implementations, the method includes: identifying a difference between (i) a first continuity constraint specifying a first state of a robot at an end of a first selected plan element and (ii) a second continuity constraint specifying a second state of a robot at a beginning of a second selected plan element; based on identifying the difference, generating a third plan element that involves changing the state of a robot from the first state to the second state; and scheduling the selected plan elements to complete the tasks in the set of tasks, with the first plan element, the second plan element, and the third plan element being scheduled to be performed by a single robot, the third plan element being scheduled to be performed by the single robot after the first plan element and before the second plan element.

In some implementations, the method includes scheduling the performance of the selected plan elements by the robots in the set of multiple robots using a constrained programming solver.

In some implementations, the method includes scheduling the scheduled plan elements by specifying a sequence of the selected plan elements and permitted concurrency of the selected plan elements in a manner that does not require synchronizing the performance of actions within the selected plan elements.

In some implementations, the method includes assigning the selected plan elements to be carried out by the respective robots in the group.

Other embodiments of these aspects include corresponding systems, apparatus, and computer programs encoded on computer storage devices, all of which may be configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
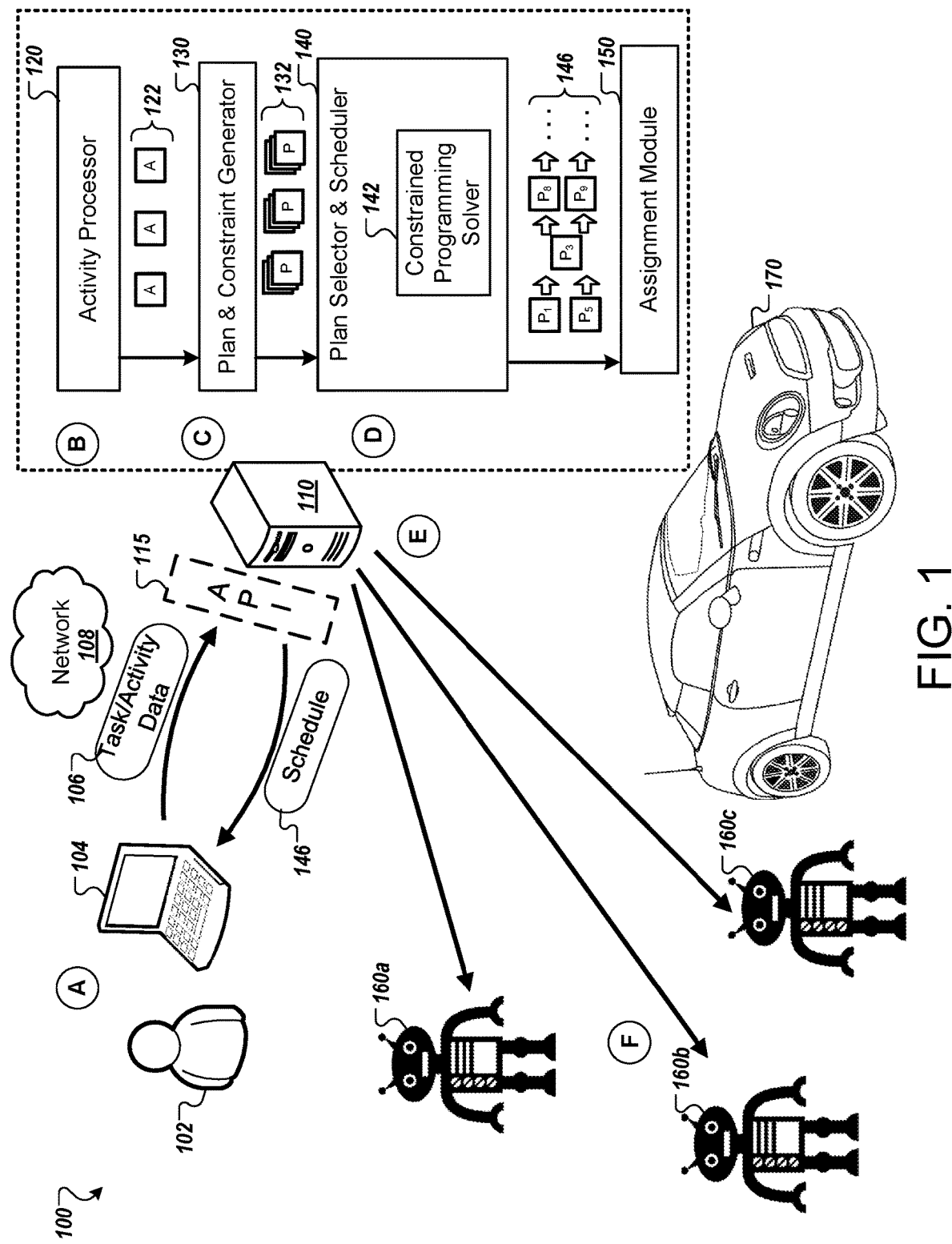
FIG. 1 is a diagram showing an example of a system for scheduling resource-constrained actions.

FIG. 1 is a diagram showing an example of a system 100 for scheduling resource-constrained actions. The system 100 includes a scheduler 110, which may be represent one or more computers, e.g., a workstation, one or more servers, a cloud computing service, etc. The scheduler 110 provides a scheduling application programming interface (API) 115 for scheduling actions. For example, the scheduling API 115 permits systems and users to indicate tasks to be performed, and the scheduler 110 plans and sequences the actions to be performed to provide an efficient schedule of actions to accomplish the tasks. The scheduling of tasks can be relative, e.g., indicating the order and overlap of the duration of tasks, rather than an absolute time for actions to occur. In the example of FIG. 1, a user 102 provides input to a client device 104 about the fabrication of an object 170, such as a vehicle or a building. The client device 104 communicates with the scheduler 110 using the API to specify the nature of the tasks to be performed, and the scheduler 110 plans and schedules actions to produce the desired results. The system 100 also includes a work cell comprising multiple robots 160a-160c, which cooperate to fabricate the object 170. FIG. 1 also shows various operations, some of which are represented as stages (A) to (F), which include a flow of data among elements of the system 110 and other actions.

In general, determining how to efficiently utilize multiple robots in a work cell in order to realize a complex process is a difficult and often computationally intensive task. One of the reasons for the difficulty is the many variables and degrees of freedom, resulting in an often massive number of alternative actions and sequences of actions to be considered. As an example, consider a robotic work cell in which parts arrive, two parts are placed over each other, and 30 weld points are needed to join the two parts together. Typically, the amount of time available to accomplish the task is limited, because the entire production line works at a particular cadence. For example, there may be a limit of 30 seconds to perform the point welds. In the work cell, there may be a number of robots that each have welding guns. The scheduler 110 would have the task of determining how to actually coordinate the actions of the robots to perform the welding actions.

As an example of the variables that the scheduler 110 adjusts, many of the weld points may be reachable by multiple robots, so there is some freedom about which robot performs which welds. There is also freedom around what order the welds are performed. Further, every point can typically be reached by more than one configuration of the robot. For example, different rotations and positions of articulating joints may achieve the same contact point with a work piece, yet all represent different configurations or ways to reach this end result. In other words, the same weld may be done by the same robot, but in different configurations. Also, when the robots are moving between weld points, from one point to another point, the robots can move through any of multiple paths to travel. The scheduler 110 can choose different paths, which will result in different conflict profiles with other robots and with static obstacles. For example, when a first robot is working and blocks a path of movement of a second robot, the first robot may wait for the second robot to finish its task and move away allowing the first robot to reach its destination in a straight path, or the first robot may travel around the second robot without waiting. These are a just few examples of the choices that can be made in the scheduling process.

Due to these many options and variable, the problem of figuring out the optimal way of accomplishing the goal of the process, such as to perform the 30 point welds discussed above, involves a huge number of possibilities. Solving the problem optimally is NP-hard, so its difficulty grows exponentially as the size of the problem increases. The scheduler 110 of the present application can solve this problem by trading off the optimality of the solution for faster and more efficient process of obtaining the results. The scheduler 110 can provide results that, while not strictly optimal, are still very good and can enable the scheduled tasks to be performed in a reasonable amount of time.

In the example of FIG. 1, in stage (A), a user 102 provides input to a client device 104 to specify activities to be performed. This information may be done by specifying specific tasks or activities, such as drilling a hole in a specific area or joining two pieces together. In some implementations, the activities to be performed are provided implicitly by providing a model, such as a computer-aided design (CAD) model indicating the shapes, features, and/or components of an item to be constructed.

The client device 104 provides task or activity data 106, which indicates the actions to be performed, to the scheduler 110 through the API 115. As an example, the API 115 provides access to a number of predetermined activities that the scheduler 110 is configured to instruct robots 160a-160c to perform. Users can select from these predetermined activities and specify a sequence of these activities to be performed. For example, the user 102 can specify the series of activities needed to fabricate the object 170.

The API 115 may provide the user 102 various layers of access to the scheduler 110. In many cases, certain specific scheduling primitives are defined by the scheduler 110 and the API 115. The API 115 can allow scheduling of a predetermined set of activities, e.g., welding, gripping, pick and place, cutting, drilling, etc. Each of these predetermined activities can be characterized by the system designer and made available for use by others through the API 115. Users can specify which activities to perform and specify parameters for the activities. For example, a user may specify a drilling activity, and designate the part to be drilled, as well as features such as the location, axis, depth, and width of the hole to be drilled. The API 115 can provide a basic mechanism for users to express scheduling constraints, such as the ordering of certain activities or specifying that certain activities should not occur concurrently.

In some implementations, the API 115 can expose a more detailed set of features so that users can code their own types of activities beyond those predefined for the system. For example, if a user wants to add an activity of using a nail gun, the user does not need to wait for the system provider to develop a nail gun activity. Using the lower-level functions of the API 115, the user may specify the capabilities and constraints of that activity, e.g., requirements for gripping the nail gun, need for a compressed air source, use of consumable nails, the size and weight of the nail gun, limits to the range of motion of the nail gun while gripped, and so on. Users also may be allowed to directly set scheduling constraints using the semaphores and continuities to direct the scheduling process.

In stage (B), the scheduler 110 receives the task or activity data 106 provided through the API 115. Using an activity processor 120, the scheduler 110 identifies the specific activities or tasks 122 that need to be performed. This can include extracting data from requests through the API 115, or potentially more intensive actions such as extracting actions from CAD models or other data indicating results to be achieved. In general, there is a series of activities 122 to be performed by the multiple robots 160a-160c.

Each activity 122 can have multiple ways of accomplishing it. An activity 122 can represent a general goal or result to accomplish, e.g., drill a hole at a particular location. The activity 122 generally does not specify the manner in which to carry out the activity, e.g., which robot 160a-160c performs the action, how the robot 160a-160c reaches the work area, the configuration of the robot 160a-160c while performing the action, etc.

In stage (C), the scheduler 110 generates candidate plan elements 132 for performing the activities 122. The scheduler 110 expands each activity 122 to yield multiple concrete ways of possibly accomplishing the goal or result represented by the activity 122. Each of the candidate plan elements 132 has a constraint profile that models the scheduling constraints that affect scheduling the plan element 132. A plan element 132 can be highly specific, for example, sufficiently defined so that it specifies an action can be sent to a robot 160a-160c or other hardware to be executed. For example, a plan element 132 may represent a specific robot 160a performing a specific set of actions.

For example, the scheduler 110 can determine multiple plan elements 132 for each activity 122. For example, the scheduler 110 generates, for each activity 122, multiple candidate plans 132 that can separately accomplish the activity 122. As a result, for each activity 122, there can be a set of different candidate plan elements 132 that each represent an alternative manner of achieving the activity 122. For example, for a given activity 122, different plan elements 132 may have actions being performed by different robots 160a-160c, involve different tools or other items, involve different robot configurations, involve different paths of travel, etc.

In some implementations, each plan element 132 starts with a resting state and ends with the robot 160a-160c in a resting state. The starting and ending condition is always that the robot 160a-160c is at rest, although the configuration of the robot 160a-160c may vary from start to finish and from one plan element 132 to another.

Each of the plan elements 132 has a constraint profile that models all of the scheduling constraints of the plan element 132. The constraint profile can represent a set of requirements including a resource "footprint" for different types of resources (e.g., space, time, robot state, consumables, tools, etc.). The scheduling constraints can be expressed using three constraint primitives: semaphores, spatial constraints, and continuity constraints. These types of constraints can express many different types of scheduling constraints.

Space is one example of a type of resource that plan elements 132 may use and require to be available though a scheduling constraint. For example, if executing a plan element 132 involves occupying a space, even for a short time such as during travel along a path, the space occupied by the plan element 132 is considered one of the requirements of the plan element 132. The constraint may be expressed by a shape that defines a region (e.g., a two-dimensional or three-dimensional region) including the entire range of space that a robot 160a-160c would pass through during performance of the plan element 132. Later, during scheduling, if two plan elements 132 are determined to have spatial constraint shapes that intersect, the overlap represents the impermissible condition of two plan elements 132 attempting to use the same space during the same or similar time period. The scheduler 110 can interpret the spatial constraints in this case as a constraint that the two plan elements cannot be performed concurrently.

To model space conflicts, spatial regions may be designated and reserved for a plan element 132. In general, each voxel in a three-dimensional area could be considered to be a resource, and each voxel could be considered to have a binary semaphore (e.g., a token indicating whether it is reserved or not). A plan element 132 that uses a spatial region would need to acquire the semaphores for all the voxels in the region of operation, in a mutex (e.g., mutually exclusive) fashion, and then return them when the plan is completed. However, at a fine-grained level of spatial resolution, the number of voxels and corresponding semaphores is often prohibitively large. To model spatial resources more efficiently, shapes are defined to represent the regions needed by different plan elements 132. These shapes can represent continuous volumes, e.g., a swept volume of the entire space that will be occupied or passed through at any point by a robot in executing the plan element 132. For example, the scheduler 110 makes a simplification that if a robot 160a-160c performs a motion, the motion has a swept volume that represents the set of all points that were ever occupied during the motion. When scheduling the plan elements 132, the scheduler 110 assumes that while the motion is taking place, the robot 160a-160c can occupy any of the included points at any point in time. In some implementations, the swept volume may optionally be represented as a slight overapproximation, e.g., a slightly larger region. For example, the boundaries of a swept volume may be extended to encompass a larger region by rounding, smoothing, or otherwise simplifying the shape. The overapproximation can maintain the desired spatial constraint because it is as large as or larger at all points than a precise swept volume, while the simpler shape of the overapproximation can reduce the computational complexity of verifying that no spatial conflicts occur.

Once the shapes of the plan elements 132 are known, during scheduling a determination whether two plan elements 132 conflict can be made by comparing the shapes, e.g., swept volumes, for the plan elements 132 to determine if there is any overlap. Where an overlap is found, a mutex is created for the overlapping region, requiring that both plan elements 132 acquire the token for the mutex before they execute and access the contested area.

Consumable resources also are indicated as constraints in the constraint profiles for the candidate plan elements 132. For example, if multiple plans require use of the same consumable resource, that presents another scheduling constraint because not all of the plans that need the consumable resource can be executed, as the resource would be exhausted first.

Resources that are not consumable can also provide scheduling constraints. For example, there may be a single tool of a particular type in the workplace, where the tool may be shared by multiple robots, for example, using a tool changer. In its constraint profile, a first plan element 132 can declare that it is using the screwdriver when it starts and that when it ends it returns the tool. Another plan element 132 may declare the same use as well as return of the tool. This effectively means that, given the constraints of the workplace, the two plan elements cannot be scheduled to occur at the same time.

The need for consumable and non-consumable resources can be represented using semaphores, e.g., a source of data tokens that represent the quantity of a resource that is available. To use semaphores, plan elements 132 can declare that they give or take a certain amount of tokens from a semaphore. More precisely, there are three types of access. A plan element 132 can take tokens from the semaphore (e.g., when the plan element 132 starts), the plan element 132 can give tokens to the semaphore (e.g., when the plan element 132 ends), and the plan element 132 can require that the semaphore value be maintained above a minimum level over the duration of execution of the plan element 132. If a plan element 132 would take more tokens from a semaphore than are available, then the plan element 132 must wait to execute until the needed amount of tokens become available from the semaphore.

Continuity constraints are used to model the state of robots 160a-160c and other elements, to ensure that the process meets continuity requirements. Continuity constraints can be used to model the state of a robot 160a-160c (or a work piece or another object) and ensure that the state changes in a smooth or valid way. Continuity constraints may be defined for many different aspects, e.g., robot location, robot pose, robot configuration, etc. As an example, the location or configuration of a robot cannot instantaneously change from the end of one plan element 132 to the start of the next plan element 132. Instead, continuity must be maintained, for example by the robot executing a plan element that moves the robot between configurations or locations. When continuity constraints are properly set and enforced, each plan element begins with the robot in the appropriate state (e.g., location, configuration, etc.) that is needed and/or expected, so that the plan element can be performed as designed. Continuity constraints can also be used to model the fact that even when a robot 160a-160c is inactive or at rest, the robot 160a-160c still occupies space and could potentially obstruct another robot 160a-160c in the vicinity.

One or more continuity constraints can be defined for each robot 160a-160c or other element to be tracked in the system 100. A plan element 132 can declare that it is using a certain continuity (e.g., a robot or an aspect of the robot), and describe the impact of the plan on that continuity aspect. For example, a plan element 132 can specify that a robot 160a-160c is at a certain configuration when the plan element 132 starts and that the robot 160a-160c is in another configuration when the plan element 132 ends. This starting state of the robot 160a-160c and ending state of the robot 160a-160c represents a requirement of the plan that is honored by the scheduler 110.

The scheduler 110 can also generate the constraint profiles to specify requirements or conditions representing the results of or the completion of activities 122. For example, if drilling a hole is one of the activities to be performed, the result or effect of having the hole created may be defined as a semaphore. In other words, the scheduler 110 may specify a semaphore or condition "has the hole been drilled?" and can require at a project-wide level that the project ends with the semaphore raised. This can also be used to constrain one plan element 132 to consume something that another plan produces. For example, one plan element 132 can require an action or result to be an input to or a pre-requisite for the plan element 132. This is one of various ways that can be used to express ordering requirements. For example, one plan element 132 involves opening a gate, and another plan element 132 involves passing through the gate. The ordering can be expressed with reference to a condition, so the scheduler 110 can determine that one plan element 132 must occur after the other plan element 132 has occurred.

In stage (D), the scheduler 110 creates a schedule 146 of plan elements 132 that meets a set of optimization criteria. The scheduler 110 can select a subset of the candidate plan elements 132 to be included in the schedule 146. The scheduler 110 organizes the selected plan elements into an appropriate partial order, and with concurrency when appropriate, to meet the optimization criteria while still meeting the constraints set in the constraint profiles of the candidate plan elements.

The scheduler 110 operates to meet any of various optimization criteria. These criteria may include one or more of, for example, achieving the least amount of time, the least amount of power, the least amount of waste or consumption, reduced area or volume, minimizing the number of different tools needed, etc. To facilitate scheduling, each plan element 132 can be associated with a cost according to the criteria to be used, and then the scheduler 110 can be assigned to minimize the overall cost.

One manner of generating the schedule 146 is using a plan selector and scheduler 140. This module, or other functionality of the scheduler 110, can select a subset of the candidate plan elements 132. In particular, one candidate plan element 132 can be selected for each of the activities 122, so that all of the activities 122 are performed. The order and concurrency of selected plan elements is also determined. With constraints modeled as discussed above, the multi-robot scheduling problem can be converted into a constrained programming problem, and a constrained programming solver 142 can be used.

The scheduler 110 synchronizes robot actions at the granularity of the individual plan elements 132. As noted above, each plan element 132 starts with a resting state and ends with the robot 160a-160c in a resting state. The starting and ending condition is always that the robot 160a-160c is at rest, although the configuration of the robot 160a-160c may vary from start to finish and from one plan element 132 to another.

With the candidate plan elements 132 for each of the activities, the scheduler evaluates the constraint profiles of the various plan elements 132, such as the semaphore constraints (e.g., resource constraints), spatial constraints (e.g., swept volume shapes), and continuity constraints, to determine which candidate plan elements 132 conflict and which depend on each other. This enables the scheduler 110 to select and schedule which candidate plan elements 132 can accomplish the sequence of activities 122 and best meet the optimization criteria.

The ordering of the selected plan elements 132 is an important determination by the scheduler 110. The outcome of the scheduling process is a subset of the candidate plan elements 132 that are generated for the specified activities 122, with an ordering between them. The ordering is made so that there are no conflicts and the scheduling constraints have been met. This can include ensuring that each aspect of continuity is maintained continuous. To maintain a valid series of transitions of states for a continuity, the scheduler 110 can determine the need for transition plans and rest plan elements, and automatically generate those plan elements. For example, if one plan element 132 ends at location A and another begins at location B, the scheduler 110 can detect the difference in location and insert a transition plan element that moves the robot 160a-160c from location A to location B so that the robot's state transitions smoothly to the location needed for the second plan element 132 to begin. This helps preserve the continuity of robot state, and avoids scheduling that would cause improper changes that cannot occur in the real world.

The scheduler 110 can assume that there is no mechanism to time-synchronize the execution of plan elements. The schedule 146 can keep a robot 160a-160c at rest and delay the start of a plan element 132 as long as needed. However, the scheduler 110 ensures that the schedule 146 will not lead to a violation of constraints, regardless of variation in plan element 132 timing, even without synchronization once execution of a plan element 132 has begun. Stated another way, the scheduling process is done so that at time of execution of plan elements by robots, synchronization does not need to be more fine-grained than the initiation and completion of plan elements. Scheduling can consider plan elements to be atomic. Thus, if a second plan element would conflict with any part of a first plan element, the second plan element is scheduled to not be initiated until the first plan element has been completed (or vice versa). In other words, the scheduling is performed based on the constraint profiles so that when two robots are in motion executing their respective plans, the system does not need to synchronize the operation of the plans with respect to each other beyond determining when it is appropriate to initiate each plan. Further, once a robot 160a-160c has been instructed to perform a plan element, the success of the overall task (e.g., execution the scheduled series of plan elements) and the avoidance of conflicts is not affected whether a robot takes 4 seconds or 6 seconds or 15 seconds to complete a given plan element and whether the execution duration varies from one execution of a plan to another. Plans that depend on or conflict with a plan element still in progress are not initiated until the current plan element finishes and returns a completion acknowledgement.

This characteristic of scheduling in a manner that does not require time synchronization for the performance of actions provides significant flexibility and reduces control requirements. Not only is there no need to precisely monitor the movement speed of each robot 160a-160c for each operation, but different robots 160a-160c that have somewhat varying speeds of movement or other action can still be interchangeably used in carrying out different plans and roles without requiring precise timing to be recalculated. Further, robots 160a-160c that do not have precise movement monitoring capabilities can be used, and the system avoids the bandwidth and computation costs of continuous monitoring.

As a result of these factors, execution of robot actions may not be done or monitored strictly in real-time. The scheduling process does not make guarantees about the completion times, and expected execution times of plans are only approximate and may vary in practice. In a similar manner, the schedule output is not time-specific and does not designate absolute time durations or start and stop times for plan elements 132. Rather, the scheduling process focuses on modeling dependencies and concurrency while achieving the goals indicated through the API 115. Overall execution time of the schedule 146 may be longer or shorter from one execution to the next, but the solution is still guaranteed to provide the correct result, with actions being performed in the correct order.

The scheduler 110 may store and access various types of information to facilitate scheduling. This information can include information about the work space, such as the number and types of tools and consumables available so that the appropriate values of tokens of the semaphores can be set. Similarly, the layout and contents of the work space can be specified, e.g., using a map or other data. In addition, data indicating the number and type of robots 160a-160c, the capabilities of the robots 160a-160c, and other data about the robots 160a-160c can be indicated. This information may be provided in advance during a set-up phase, may be provided through the API 115, or through other means.

In stage (E), the scheduler 110 optionally provides the schedule 146 to the client device 104. The schedule 146, including a definition of the selected plan elements and the ordering of them, can be provided so that the user 102 can review the plan and if appropriate implement it with a set of robots.

In stage (F), the scheduler 110 or another system can use the schedule 146 to send instructions to the robots 160a-160c to execute the plan elements and perform the desired tasks. For example, the scheduler 110 can include an assignment module 150 configured to interpret generated schedules and send instructions to different robots 160a-160c. When executing plans, the scheduler 110 defers the starting of execution of a plan element 132 until all the preconditions for starting the plan element 132 have occurred.

The techniques discussed above can be used in a variety of applications, not only multi-robot scheduling. For example, classes of problems that involve scheduling or routing or both can be performed. The techniques can be used in many other areas including logistics and shipping.

As discussed above, the scheduler can be used to solve resource-constrained project-scheduling problems, modeled after typical problems appearing in the field of industrial automation. A project can be modeled as a set of activities that need to be performed in order to start at a given starting condition and reach a given ending condition. Those activities are provided by a client, for example, as a collection of activity objects. Each activity object is a generator of plan elements, each plan element being a concrete sequence of actions that can be scheduled. For a given activity object, various plan elements can represent different alternatives of achieving a similar goal, generally with different implications, such as different durations or different sets of resources being used.

Typically, a plan element will have some requirements about the set of conditions it can be scheduled in and will impact the conditions that occur while it is executing and after it has finished executing. These conditions can represent the constraint profile or "footprint" of the plan element. Every plan element has a constraint profile, and the constraint profiles of the plan element collection form the basis of our scheduling constraints.

A set of conditions being satisfied constitutes an environment. The details of what these environments represent are typically opaque to the scheduler, it is merely the client's way of representing a set of conditions in a more concrete way. Those environment objects will be constructed by a client-provided environment generator, based on a set of conditions prescribed by the scheduler. Whenever the scheduler requests an activity object to be evaluated, it will pass an environment object, satisfying the initial conditions requested by this activity object's constraint profile, and possibly other conditions, representing constraints it wants the activity object to consider. Some of these conditions are hard, meaning they are guaranteed to be satisfied whenever the activity object gets executed, hence, there is no point for the activity object to ignore them, while other conditions are soft, meaning they may or may not be satisfied while the activity object executes, so the activity object may ignore them and let the scheduler handle the conflicts. Ideally, whenever soft conditions are encountered that conflict with the requirements of an activity object, the activity object will generate some plan elements that respect the constraints and some that don't, giving the scheduler both alternatives to work with.

The process of going from an activity object to a collection of plan elements can be more involved than a single function that generates them. For example, the activity object can generate a root of a tree, which can be lazily expanded, where each leaf eventually contains a single plan element. This can support future use cases where activity objects might ultimately expand into a large number of plan elements and the scheduler would like to selectively expand the tree as needed, using some heuristics provided by the intermediate nodes in the tree. In simpler example, a utility function can take a root of a tree and exhaustively expand it to yield its plan elements.

In general, there are three major kinds of entities constituting a condition: semaphores, shapes, and continuities.

A semaphore can be a non-negative integer variable that is used to represent or track resource usage and availability. A plan element may specify that it wants to decrement a semaphore by some amount K when the plan element begins and increment it by an amount M when the plan element exits. This implies that the plan element could only be scheduled whenever it is guaranteed that this semaphore's value is greater than or equal to K throughout the duration of the plan element. Any plan element scheduled after it can assume that the semaphore's value will be the prior value minus K plus M. In addition to those entry and exit deltas, a constraint profile may specify a sustained minimum, which is used to enforce a minimum on the semaphore's value throughout the duration of the plan element, without actually modifying the semaphore value. This simple concept of semaphores is very powerful and can be used to express a wide variety of scheduling constraints. Some examples include:

(1) Plan elements A, B and C all require an exclusive access to a common resource, thus should not be scheduled concurrently. This can be modeled as: the common resource is modeled as a semaphore, initialized to 1; each of the plans {A, B, C} declares a −1 for this semaphore on entry and +1 on exit.

(2) Plan element A performs an operation that both plans B and C depend on. This can be modeled as: the fulfillment of the operation is represented by a semaphore initialized to 0; plan A declares a +1 for this semaphore on exit; both plans {B, C} declare a sustained minimum of 1 for this semaphore.

(3) A global (time-invariant) decision between 3 options needs to be made. Plan elements {A, B, C} depend on the {1st, 2nd, 3rd} option being taken, respectively. Note that this implies that A, B, C not only cannot be scheduled concurrently, like in the first case, rather they must not ever appear on the same schedule. This can be modeled as having one semaphore per choice and {A, B, C} each have a sustained minimum of 1 on their respective choice. In addition, 3 "preparation" plan elements are specified, P1, P2 and P3, each taking 0 time and having a +1 for its respective choice semaphore on exit. Finally, in order to ensure mutual exclusivity of those choices, a fourth binary semaphore is declared, initialized to 1, where each of {P1, P2, P3} has a −1 for it on entry. Typically, P1, P2 and P3 will be generated by a single activity object instance, whose sole responsibility is to make the choice.

Each project specifies its semaphore boundary conditions through a map of these boundary conditions. These objects specify an initial value for the semaphore at the start of the project, as well as the acceptable range of values for the final value of the semaphore. This allows for the user to enforce specific changes to semaphores across the execution of the project.

Shapes are the second kind of entity constituting a condition. Shape constraints can be thought of as an array of binary semaphores, with infinitely many elements, each representing a point in space. A plan element may claim (+1) a subset of these points while executing, then return (−1) them when done. The subset is expressed as a shape and thus determining contention between two plans is equivalent to determining whether or not their corresponding shapes intersect. This is particularly useful to model physical space occupancy, where contention represents a collision. In some implementations, the shapes themselves are abstract entities from the scheduler's point of view. The scheduler can refer to them using client-provided identifiers and, at least in some instances, may delegate responsibility for determining intersection to the client.

The third kind of entity constituting a condition is a continuity. This entity represents aspects of the environment's state, which have to maintain continuity. The canonical example is robots, which cannot change configuration in 0 time and cannot disappear, even when they are not doing anything. At any point in time, every continuity is in a specific configuration. Plan elements may express requirements on which continuities need to be in which configurations before the plan start and what will be their respective configurations after it ends. Only plan elements can cause configurations to change, the scheduler doesn't change their values arbitrarily. When a plan element declares its use of a continuity, that continuity implicitly acts as a mutex also, i.e., two plans that declare the same continuity can never be scheduled at the same time. Another point worth mentioning is that continuities should be completely independent of each other, i.e., changing the configuration of one should never impact the configuration of another. In some implementations, users specify a map of continuity boundary conditions for their project. Each entry of this map specifies initial and final configurations for one continuity.

The scheduler can be configured to insert appropriate transitions and rests to align and connect sequences of plan elements. The scheduler has the task of ensuring the continuity of the continuity constraints, or in other words, the problem of, for every continuity, "connecting the dots" between its configuration at the end of one plan to the beginning of the next. This responsibility may be somewhat shared between the scheduler and the client. The scheduler may decide what needs to be connected and the client may decide how. Concretely, this is done by the client providing a transition generator object to the scheduler. The transition generator object handles requests from the scheduler to dynamically generate activity objects, whose sole purpose is connecting two configurations of a continuity together. Just like any other activity object, these activity objects will be evaluated in a given environment and may return multiple alternative plan elements.

Because plan elements on the scheduler are not always packed tightly, e.g., there may be times when a given continuity is not being used by any plan element, the scheduler will fill this space with rest plan elements. A rest plan is a very simple one: its sole purpose is to keep a single continuity in a given configuration. It is intended to provide the scheduler with information about the constraint profile of keeping the continuity at rest. As such, rest plans may not have "real" actions to be executed, but may still specify action for annotation purposes. Their duration must be negative, to indicate that the scheduler is free to "stretch" them for as long as needed in order to fill in the gaps between plan elements on either side. Note that other plan elements may not be stretched.

Like plan elements, activity objects also have constraint profiles, which comprise the common denominator of their plan elements' constraint profiles. In other words, an activity object's constraint profile is guaranteed to be a shared impact of every plan element it generates, but individual plan elements may have additional impact. The expectation is that each plan element from an activity object contains the constraint profile of that activity object within its plan elements. For example an activity-object-level semaphore usage would be split between the plan elements in a sequence where the first plan element has the entry decrement, the last plan element has the exit increment and all of the plan elements have the sustained minimum. For shapes defined in the activity-object-level constraint profile we would append them to all of the plan elements in the sequence. The activity-object-level constraint profiles are mostly intended to express goals or milestones of our project being accomplished and to form activity object-level precedence constraints. An activity object defines what is accomplished, while a plan element defines how it is accomplished.

Plan elements can have additional attributes. One is a vector of data elements (e.g., of strings or other values) called actions. The actions are instructions how to execute the plan element, once it is time to do so. The scheduler does not need to understand the contents of those data elements, but merely keeps them with the plan elements, so that once the resulting schedule is generated it can be more easily carried out.

In addition, a plan element can have a speculation point attribute. The speculation point allows the system to reevaluate the plan during execution in response to feedback (can be seen as an input or a return value of an action).

Multiple plan elements can be concatenated into a single plan element. The resulting plan will have a constraint profile which integrates all the constraint profiles of the children, action vectors are concatenated and the speculation point is taken from the first non-null speculation point in the sequence. The opposite is not true: a single plan element cannot generally be decomposed into a sequence of smaller plan elements. The constraint profile of any single plan element in a sequence is always "smaller" (less constrained) than the constraint profile of the concatenated sequence. Thus the scheduler can selectively concatenate adjacent plan elements in a sequence in order to trade-off between having less items to schedule vs. having more items, which are less constrained (e.g., finer granularity or resource usage). Since a single plan element cannot be split, activity objects should generally prefer generating a long sequence of "small" plan elements vs. a short sequence of "long" plan elements. However, sometimes the "longer" plan elements might be more efficient (for example, we can merge together a few motions without having to stop in between). In such cases, the best thing for the activity object to do is generate multiple alternative sequences, some optimized for efficiency and others for granularity, and leave it to the scheduler to figure out what works best in the grand scheme of things.

A plan element sequence can describe a set of plan elements that must execute in order. This means that the order they are specified in the sequence is the order that they will appear in the schedule. The plan element also guarantees that the plan elements in the sequence will either all execute or none of them will execute.

The discussion above describes the inputs to the scheduler. This section will discuss its output, namely the schedule. The schedule can be a directed, acyclic graph (DAG) of selected plan elements, imposing an execution order, which satisfies all the scheduling constraints and (approximately) minimizes the predicted execution time. Because all plan element durations are estimates, correct execution of the schedule involves executing the plan actions in graph order, rather than at predetermined times. The DAG guarantees that no matter what the actual execution times of the plans end up being, the constraints will always be met.

Nevertheless, for planning or analysis purposes, it is perfectly acceptable to assume ideal execution (plan elements take exactly their specified duration, everything executed as soon as possible), and thus assign every plan element with estimated start/end times. Therefore, the scheduler assigns estimated start and end times to every scheduled plan.

When examining the set of plan elements claiming any given continuity, there will be no gaps in the schedule. Rest plans will be stretched to fill them in if need be and their durations will be assigned by the scheduler to reflect the estimated rest time. Furthermore, the continuities will all have full coverage from time 0 to the end time of the project, defined as the maximum end time over all the plans in the schedule.

Some activities react to execution feedback, hence cannot be fully planned until executed. The way the system deals with this is to have the activity produce some speculative plan element(s), based on assuming some nominal values for what the execution input might be. However, such plan elements will specify that only a certain number of actions in its actions member should actually be executed (e.g., a "concrete" action), which is typically smaller than the total number of actions that the plan element has. Those plan elements will also include a speculation point. The speculation point can be thought of as a closure, which accepts the actual execution input and produces a new plan element starting after the last concrete action of the plan. During execution, the executor can detect that a plan element is speculative (e.g., has a speculation point) and execute only its concrete actions. Then, it should use whatever input it has available (typically, a result of executing the last action) and feed it into the speculation point, to yield a new set of alternative plan elements. While feeding input into the speculation point, we also feed in an environment, which represents a new set of conditions that more closely match reality during execution. The framework may invoke the speculation multiple times, in different environments to reflect different constraints. The speculation point needs to be ready to handle a new environment every time it is asking for input. In addition to the activity itself being re-planned, any rest and transition plans following it should generally be regenerated, as the new plan potentially results in different continuity configurations. The set of continuities used by the new plan elements should be the same as the one used by the original plan. Thus, at least in some implementations, an activity must determine the set of continuities used before its speculation point.

Figure 2:
FIG. 2 is a diagram illustrating an example of a user interface for specifying tasks to be performed.

FIG. 2 is a diagram illustrating an example of a user interface 200 for specifying tasks to be performed. The user interface 200 indicates a set of available activities 210 that represent predefined activities supported by a scheduling system. The user interface 200 enables a user to select one of these activities 210 and enter parameters for the activity (e.g., such as which pieces to act on, which portion of the piece to affect, etc.). A sequence of selected activities 230 has been specified by the user, involving cutting pieces, gluing pieces together, and then drilling three holes. The user interface 200 also provides a control 220 permitting a user to open a model file or other specifications for actions. For example, a user may submit a list or spreadsheet of activities and corresponding parameters.

Figure 3:
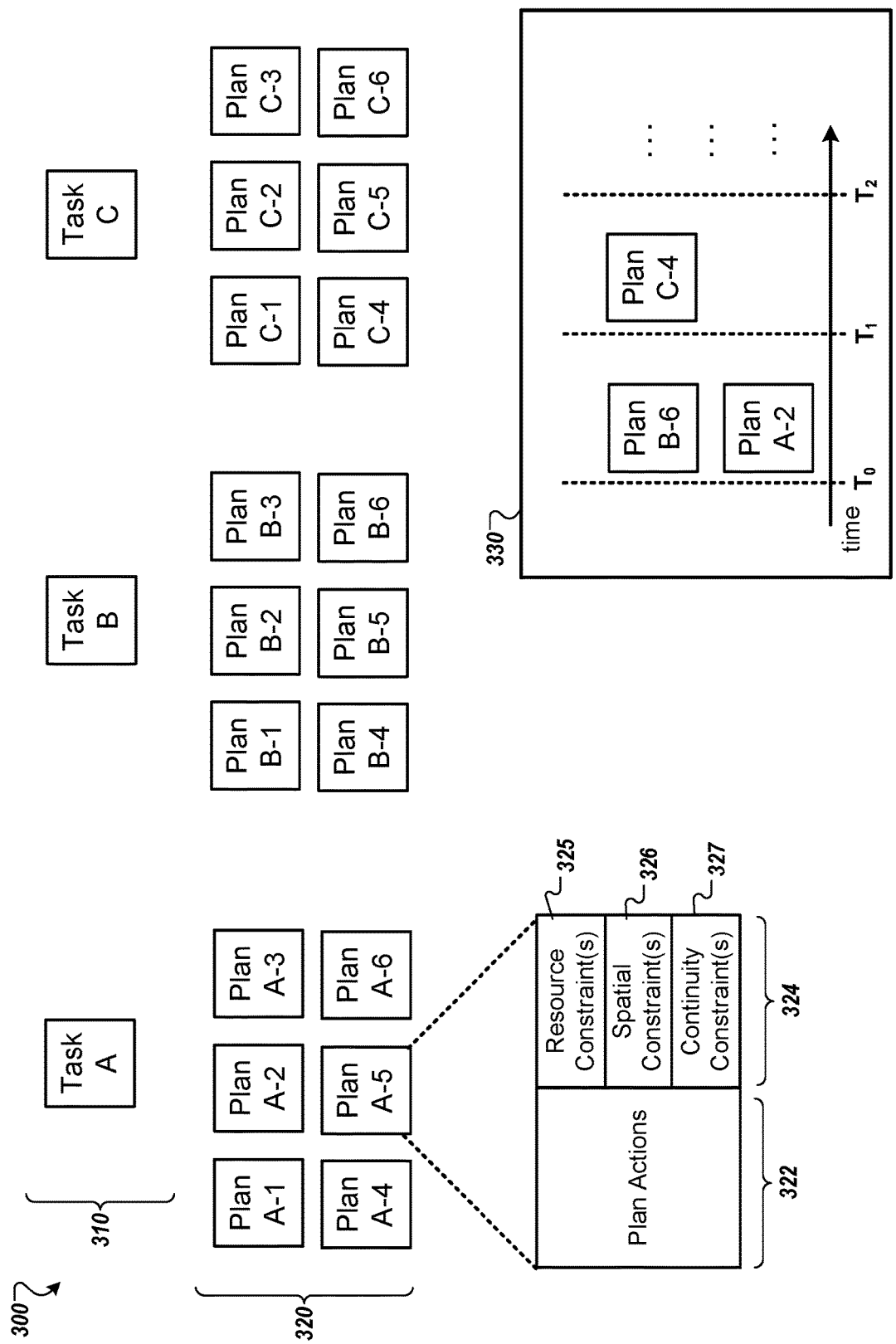
FIG. 3 is a diagram illustrating an example of processing to generate scheduled plan elements.

FIG. 3 is a diagram illustrating an example of processing 300 to generate scheduled plan elements. For example, based on input through the API 115, the scheduler 110 receives data indicating three activities 310, shown as Task A, Task B, and Task C. For each of the activities, the scheduler 110 generates a corresponding set of candidate plan elements 320. For example, plan elements A-1 to A-6 each represent different ways of accomplishing Task A. Plan elements B-1 to B-6 each represent different ways of accomplishing Task B. Plan elements C-1 to C-6 each represent different ways of accomplishing Task C.

Each of the plan elements 320 includes a set of plan actions 322, such as actions for a robot to perform (e.g., movement, altering a work piece, acquiring or placing objects, etc.). Each plan element 320 also has a corresponding constraint profile 324, which includes one or more resource constraints 325, spatial constraints 326, and/or continuity constraints 327.

The scheduler uses the constraint profiles 324 for the candidate plan elements 320 to select a subset of the candidate plan element 320 and place them relative to each other in terms of their dependency and permitted concurrency. This is shown with a plan or schedule 330. This shows that one plan element 320 has been selected for each of the different activities 310, ensuring that each activity 310 will be performed. In the example, the selected plan elements B-6 and A-2 can be performed concurrently, but selected plan element C-4 cannot. This ordering could be due to any of various scheduling constraints, such as the action of plan element C-4 requiring the output of one or both of plan elements B-6 and A-2, the need to wait for availability of a tool or other resource, a need to wait until space needed for plan element C-4 is conflict-free, and so on.

Figure 4:
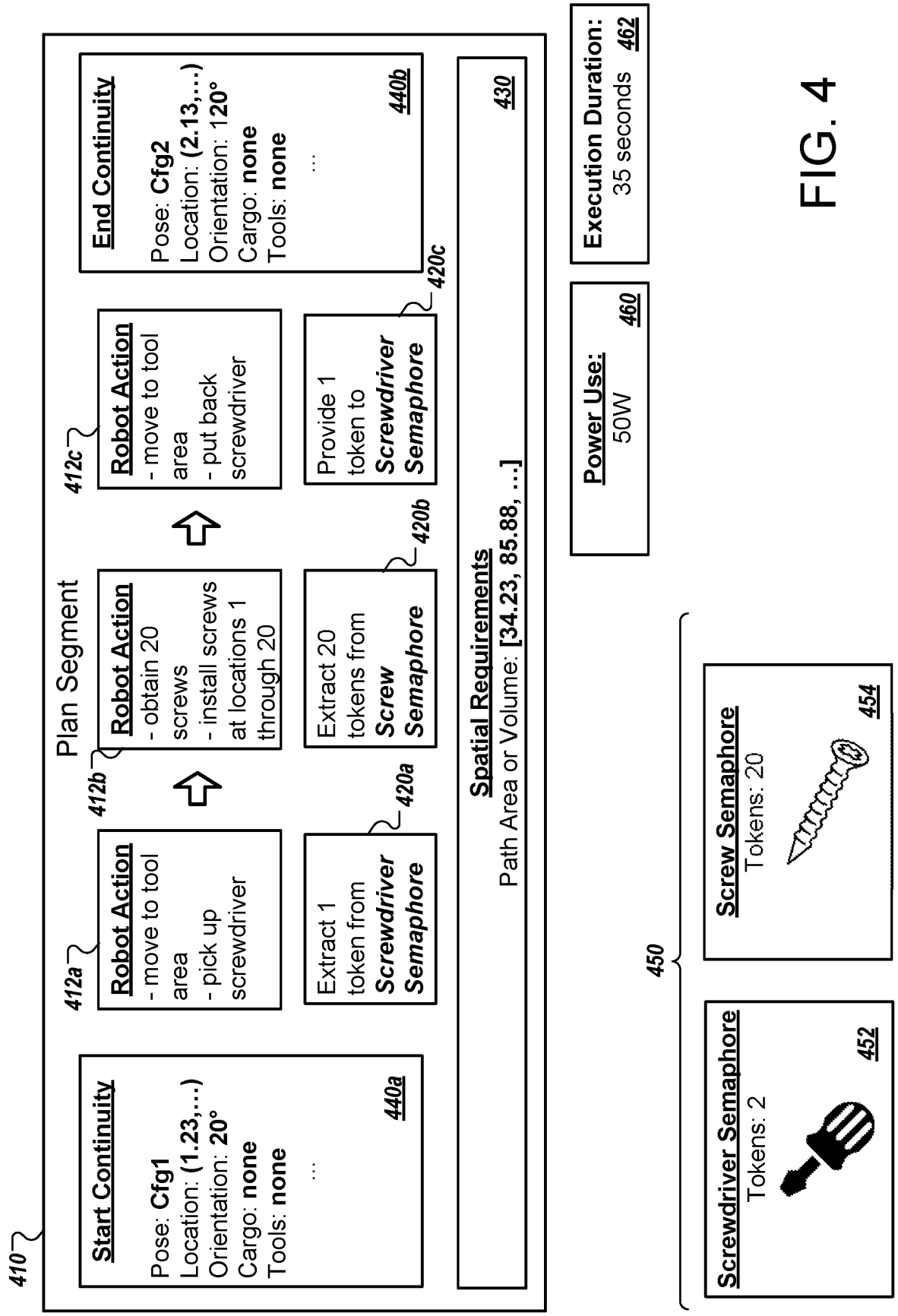
FIG. 4 is a diagram illustrating an example of a plan segment with constraints.

FIG. 4 is a diagram illustrating an example of a plan segment 410 with constraints. The example plan segment 410 includes a series of robot actions 412a-412c, which represent actions performed by a robot that would achieve the goal of the activity the scheduler 110 generated the plan segment 410 to perform. There are also a number of scheduling constraints that form a constraint profile for the plan segment 410.

The plan segment 410 has three semaphore-based constraints 420a-420c, each of which involve a physical resource of some kind and interacts with one of the semaphores 450. Constraint 420a indicates that the robot needs to acquire a screwdriver, and so one token needs to be extracted from the screwdriver semaphore 452 during the plan segment 410. Then constraint 420b indicates that 20 screws are needed, requiring extraction of 20 tokens from the screw semaphore. At the end of the plan segment 410 the screwdriver is replaced, so the constraint 420c indicates that a token is returned to the screwdriver semaphore 452.

Another constraint is a spatial constraint 430, indicating a spatial region in which the robot will pass over the course of performing the actions 412a-412c. This may be expressed in any appropriate manner, such as a 2D or 3D polygon or as vertices that define positions within a map or coordinate system.

Additional constraints are provided by (i) a start continuity constraint 440a indicating a state of the robot at the beginning of the plan segment 410 and (ii) an end continuity 440b indicating a state of the robot at the end of the plan segment 410. These continuity constraints 440a, 440b indicate various aspects of robot state, such as pose (e.g., physical position, articulation, configuration, etc.), location of the robot, orientation, cargo, tools, etc. As indicated in the example, the robot begins at a first location and a first pose (e.g., configuration "Cfg1") and ends at a second location and a second pose (e.g., configuration "Cfg2").

Figure 5:
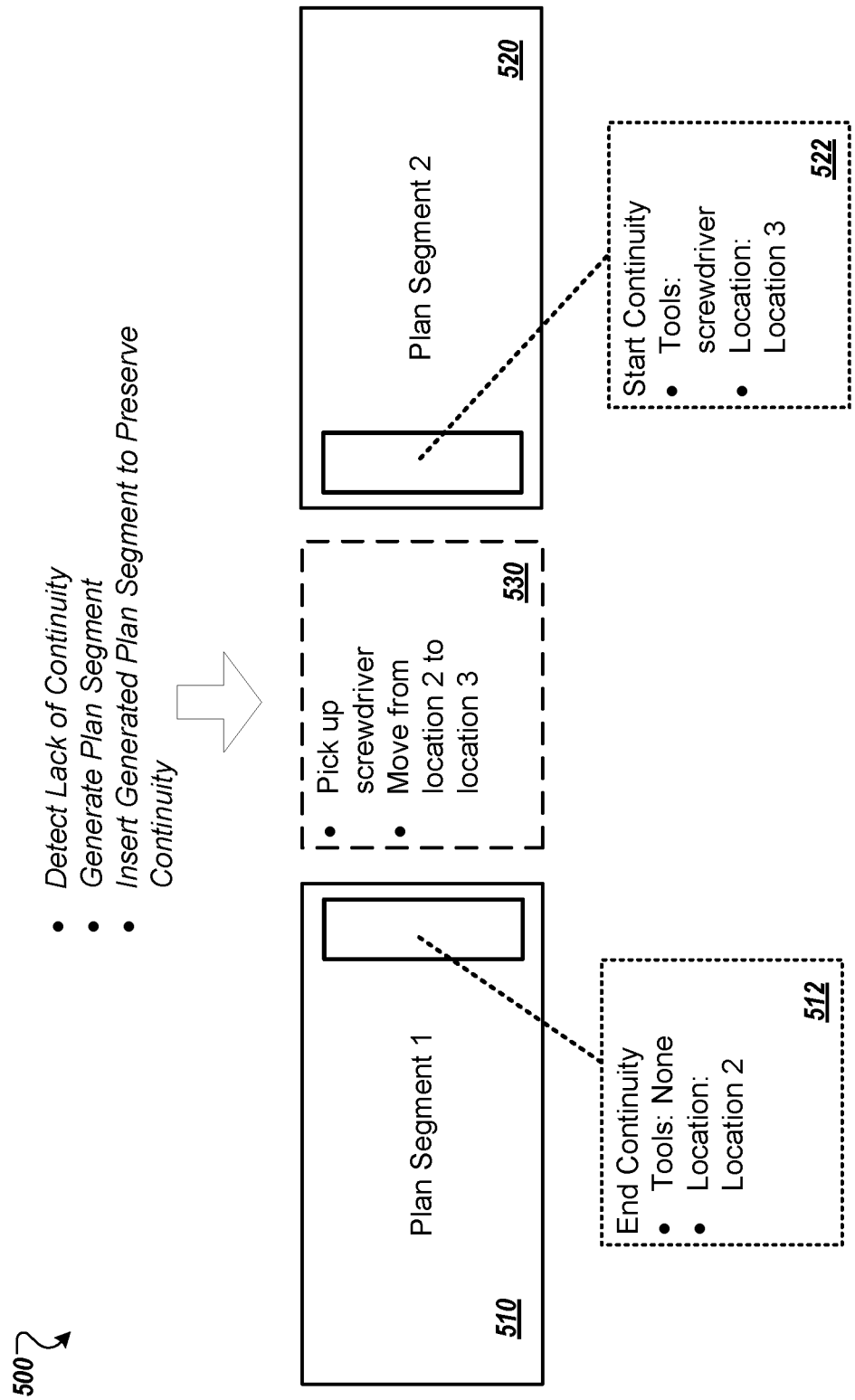
FIG. 5 is a diagram illustrating an example of maintaining continuity when scheduling plan elements.

FIG. 5 is a diagram illustrating an example of a maintaining continuity when scheduling plan elements. The example shows a first plan segment 510 and a second plan segment 520 that the scheduler 110 has selected to be included in a scheduled plan. However, the first plan segment 510 has an end continuity that differs from a start continuity 522 of the next plan segment 520. As a result, a robot would not be able to directly follow the instructions of plan segments 510, 520 alone, because upon beginning the plan segment 520, the robot would be at the wrong location and would be lacking the screwdriver need for plan segment 520.

The scheduler 110 evaluates the continuities at the interface of each selected plan segment. As part of scheduling, the scheduler 110 can detect a lack of continuity at the boundary between two plan segments and can generate a transition plan segment 530 in response. The transition plan segment 530 does not represent an action requested by a user or an action needed to perform a fabrication action. Nevertheless, the transition plan segment 530 provides the transition needed from the end continuity 512 to the start continuity 522 so that the overall sequence of plan elements can be performed by a robot. The scheduler 110 can automatically generate and insert transition plan segments as needed to maintain continuities and complete a schedule. This can include inserting periods of rest or actions to move robots away from a work piece, e.g., to avoid conflict or to make space for other robots to work more efficiently.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more processors, the method comprising:
   obtaining, by the one or more processors, data indicating a set of tasks to be performed by a group of robots;
   determining, by the one or more processors, a set of candidate plan elements for each task in the set of tasks, wherein each of the sets of candidate plan elements includes combinations of candidate plan elements that provide alternative ways for the robots to perform the task;
   determining, by the one or more processors, a constraint profile for each of the candidate plan elements, wherein each of the constraint profiles indicates a constraint to be satisfied in order to carry out the corresponding candidate plan element;
   selecting an initial ordering of plan elements;
   determining, based on a continuity constraint between a pair of adjacent plan elements in the initial ordering of plan elements, that a difference in state occurs between the pair of adjacent plan elements, wherein the continuity constraint for a second plan element of the pair relates to an object in the workcell to be used by the robot;
   in response, generating a transition plan element and inserting the transition plan element between the pair of adjacent plan elements in the selected sequence of plan elements to generate a modified ordering of plan elements;
   wherein the transition plan element includes operations that, when executed by the robot, satisfy the continuity constraint for the second plan element by causing the robot to (i) perform a reposition movement and (ii) perform an action on the object to be used by the robot when executing the second plan element of the initial ordering of plan elements; and scheduling execution of the modified ordering of plan elements on the robot.

2. The method of claim 1, wherein, for each of at least some of the constraint profiles, the constraint profile indicates a resource constraint that represents one or more resources that a robot needs in order to carry out actions of the corresponding candidate plan element.

3. The method of claim 2, wherein the resource constraint comprises a constraint to acquiring one or more tokens from a semaphore representing a level of availability of one or more resources.

4. The method of claim 3, wherein a particular constraint profile includes a resource constraint for a consumable resource, the particular constraint profile indicating that the corresponding candidate plan element acquires tokens from a semaphore for the consumable resource and the tokens are expended as a result of performing the actions of the candidate plan element.

5. The method of claim 3, wherein a particular constraint profile includes a resource constraint for a non-consumable resource, the particular constraint profile indicating that the corresponding candidate plan element (i) acquires a token from a semaphore for the non-consumable resource in order to carry out actions of the corresponding candidate plan element and (ii) retains or returns the acquired token to the semaphore for the non-consumable resource.

6. The method of claim 1, wherein, for each of at least some of the constraint profiles, the constraint profile indicates a spatial constraint on positioning of a robot, the spatial constraint representing a region that a robot needs to occupy in order to carry out the actions of the candidate plan element.

7. The method of claim 6, wherein the region is a two-dimensional region.

8. The method of claim 6, wherein the region is a three-dimensional region.

9. The method of claim 6, wherein the region comprises one or more swept regions representing all points occupied by a robot in carrying out the actions of the corresponding candidate plan element.

10. The method of claim 6, wherein the spatial constraint is expressed as a mutex such that the entire region is required to be available in order to initiate the actions of the candidate plan element, and other robots are blocked from entering the region until the end of the actions of the candidate plan element.

11. The method of claim 1, wherein, for each of at least some of the constraint profiles, the constraint profile indicates the continuity constraint that constrains a state of a robot at a beginning and/or an end of carrying out the actions of the candidate plan element.

12. The method of claim 11, wherein the state of the robot comprises a location of the robot.

13. The method of claim 11, wherein the state of the robot comprises at least one of a configuration of the robot, a pose of the robot, or an item carried or not carried by the robot.

14. The method of claim 1, wherein at least one of the constraint profiles indicates (i) a resource constraint requiring availability of a resource, (ii) a spatial constraint requiring availability of a spatial region, and (iii) the continuity constraint requiring a state or configuration of a robot at a beginning and/or end of a candidate plan element.

15. The method of claim 1, wherein scheduling execution of the modified ordering of plan elements on the robot comprising:

scheduling, the transition plan element to be performed by the single robot after the first plan element and before the second plan element.

16. The method of claim 1, comprising scheduling a performance of the selected sequence of plan elements by robots in the group robots using a constrained programming solver.

17. The method of claim 1, comprising scheduling the scheduled plan elements by specifying a permitted concurrency of the selected sequence of plan elements in a manner that does not require synchronizing a performance of actions within the selected sequence of plan elements.

18. The method of claim 1, comprising assigning the selected sequence of plan elements to be carried out by respective robots in the group of robots.

19. A system comprising:
one or more processors; and
one or more computer-readable media storing instructions that, when executed by the one or more processors, cause the one or more processors to perform operations comprising:
obtaining data indicating a set of tasks to be performed by a group of multiple robots;
determining a set of candidate plan elements for each task in the set of tasks, wherein each of the sets of candidate plan elements includes combinations of candidate plan elements that provide alternative ways for the robots to perform the task;
determining a constraint profile for each of the candidate plan elements, wherein each of the constraint profiles indicates a constraint to be satisfied in order to carry out the corresponding candidate plan element;
selecting an initial ordering of plan elements;
determining, based on a continuity constraint between a pair of adjacent plan elements in the initial ordering of plan elements, that a difference in state occurs between the pair of adjacent plan elements, wherein the continuity constraint for a second plan element of the pair relates to an object in the workcell to be used by the robot;
in response, generating a transition plan element and inserting the transition plan element between the pair of adjacent plan elements in the selected sequence of plan elements to generate a modified ordering of plan elements;
wherein the transition plan element includes operations that, when executed by the robot, satisfy the continuity constraint for the second plan element by causing the robot to (i) perform a reposition movement and (ii) perform an action on the object to be used by the robot when executing the second plan element of the initial ordering of plan elements; and
scheduling execution of the modified ordering of plan elements on the robot.

20. One or more non-transitory computer-readable media storing instructions that, when executed by one or more processors, cause the one or more processors to perform operations comprising:
obtaining data indicating a set of tasks to be performed by a group of multiple robots;
determining a set of candidate plan elements for each task in the set of tasks, wherein each of the sets of candidate plan elements includes combinations of candidate plan elements that provide alternative ways for the robots to perform the task;

determining a constraint profile for each of the candidate plan elements, wherein each of the constraint profiles indicates a constraint to be satisfied in order to carry out the corresponding candidate plan element;

selecting an initial ordering of plan elements;

determining, based on a continuity constraint between a pair of adjacent plan elements in the initial ordering of plan elements, that a difference in state occurs between the pair of adjacent plan elements, wherein the continuity constraint for a second plan element of the pair relates to an object in the workcell to be used by the robot;

in response, generating a transition plan element and inserting the transition plan element between the pair of adjacent plan elements in the selected sequence of plan elements to generate a modified ordering of plan elements;

wherein the transition plan element includes operations that, when executed by the robot, satisfy the continuity constraint for the second plan element by causing the robot to (i) perform a reposition movement and (ii) perform an action on the object to be used by the robot when executing the second plan element of the initial ordering of plan elements; and scheduling execution of the modified ordering of plan elements on the robot.

* * * * *